3,514,449
PROCESS FOR SEPARATING THE CIS ISOMER FROM A MIXTURE OF CIS AND TRANS N-[3 - (2 - CHLORODIBENZ[b,e]OXEPIN - 11(6H)-YLIDENE)-PROPYL]PIPERAZINE
James R. Tretter, East Lyme, Conn., assignor to Chas. Pfizer & Co., Inc., New York, N.Y., a corporation of Delaware
No Drawing. Filed Jan. 16, 1967, Ser. No. 609,345
Int. Cl. C07d 51/70
U.S. Cl. 260—240      9 Claims

ABSTRACT OF THE DISCLOSURE

The cis isomer of N-[3-(2-chlorodibenz[b,e]oxepin-11(6H)ylidene)-propyl]piperazine is separated from its admixtures with the trans isomers by dissolving certain acid amine salts of the mixed isomers in aqueous solutions of certain metal or ammonium salts having the same anion as the anion of the oxepin amine salt, and then recovering the less soluble cis salt which crystallizes out.

This invention relates to a process for separating the cis isomer from a mixture of the cis and trans isomers of N-[3-(2-chlorodibenz[b,e]oxepin - 11(6H) - ylidene)-propyl]piperazine, an intermediate useful in the preparation of pharmacologically active compounds.

As is well known, many amino propylidene-substituted compounds are valuable as psychotherapeutic agents in the chemotherapy of mental diseases, and especially for the treatment of depressed or excited states. Some of them are potent anti-emetics, while others are of use as regulators of the autonomic nervous system and may exhibit antiserotonin, antihistaminic, and anticholinergic activity. Indeed, compounds in this series and their methods of preparation have been described in the previously submitted applications of James R. Tretter and Barry M. Bloom, Ser. No. 356,033, filed Mar. 31, 1964 and now abanboned; and James R. Tretter, Ser. No. 403,326, filed Oct. 12, 1964 and issued as U.S. Pat. No. 3,354,155.

One series of compounds in the above class, the aminopropylidene-dibenzoxepines, can exist in 2 geometrical isomeric forms, viz., cis and trans. In many cases, these isomers may differ in pharmacological activity, and for this reason one isomer may be of more value than the other.

In our researches into the preparation and pharmacological activity of 4 - [3 - (2 - chlorodibenz[b,e]oxepin-11 (6H)-ylidene)-propyl]-1-piperazine ethanol dihydrochloride,

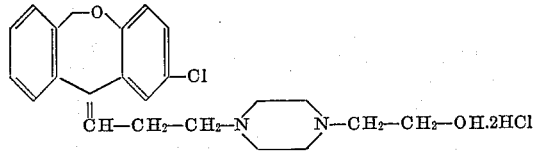

we have found that the cis isomer of this compound possesses a higher degree of pharmacological activity than the trans isomer. Consequently, owing to the fact that both isomers are formed in the preparation of this compound, it would be desirable to be able to isolate the pure cis isomer from the cis and trans mixture.

This problem can be approached either by attempting to separate directly the trans and cis forms of the final desired product, or alternatively to separate the cis and trans isomers of a suitable precursor used in the preparation of 4-[3-(2-chlorodibenz[b,e]oxepin - 11(6H) - ylidene)-propyl]-1-piperazine ethanol dihydrochloride. We have chosen to follow the latter course and have devised a process for the isolation of the pure cis isomer of N-[3 - (2 - chlorodibenz[b,e]oxepin-11(6H)-ylidenepropyl] piperazine, which is the immediate precursor in the preparation of N-[3-(2-chlorodibenz[b,e]oxepin-11(6H)-ylidene)-propyl]piperazine ethanol dihydrochloride.

The present invention comprises a method of isolating the cis isomer from an intimate mixture of both the cis and trans isomers of N-[3-(2-chlorodibenz[b,e]oxepin-11(6H)-ylidene)-propyl]piperazine. Surprisingly and unexpectedly, we have found that this objective can be realized by crystallizing the diacid amine salts of this latter compound from aqueous solutions of certain specific salts, wherein these salts are so selected that their anions are identical with the anion of the said diacid amine salt.

More specifically, the acid amine salt Am·2HX, wherein Am is the free amine and X is a member selected from the group consisting of chloride, bromide, nitrate, and sulfate (when X=sulfate, the acid amine salt is simply Am·H$_2$SO$_4$), is recrystallized from an aqueous solution of the salt MX, wherein X is as previously defined and M is a cation selected from the group consisting of sodium, potassium, lithium, ammonium, monomethylammonium, dimethylammonium, and tetraethylammonium.

As pointed out above, the salt MX is selected from among those having anions, X, identical with the anion of the diacid amine salt to be recrystallized. Thus, the cis isomer of N-[3-(2-chlorodibenz[b,e]oxepin-11(6H)-ylidene)-propyl]piperazine can be isolated from a mixture of the cis and trans isomers by recrystallization of the amine dihydrochloride from aqueous solutions of sodium, potassium, lithium, ammonium, monomethylammonium, dimethylammonium, and tetramethylammonium chloride.

We find it desirable to recrystallize the diacid salts of N - [3-(2-chlorodibenz[b,e]oxepin-11(6H)-ylidene)-propyl]piperazine only from aqueous solutions of salts MX having the same anion X contained in the diacid amine salt, Am·2HX. Thus, for example, we would not normally recrystallize the diacid amine salt Am·2HNO$_3$ from an aqueous ammonium chloride solution; since under these conditions it is very likely that both Am·2HNO$_3$ and Am·2CHl will crystallize from solution. This later possibility could conceivably cause difficulty in the isolation of the cis isomer of the amine, and we feel that it is better to avoid such possible complications by following the procedure suggested above.

It has been found in all cases that of the cis and trans isomers of the diacid amine salts of N-[3-(2-chlorodibenz[b,e]oxepin - 11(6H) - ylidene)-propyl]piperazine, the cis isomers have the lower solubility in the aqueous solutions of the salts MX. Thus upon cooling a hot solution of the cis and trans acid amine salts in an aqueous salt solution MX, the cis acid amine salt crystallizes from solution first, and can be conveniently separated. In some cases one such recrystallization has provided the cis isomer in almost pure form.

To our knowledge this is the first time that a separation of such cis and trans geometrical isomers has been effected in this manner. At the present time we do not fully understand the reasons for the success of this method. Regardless of the physical principle on which the success of the process depends, we would not wish to restrict the scope of the present invention by the suggestion of any incorrect theory.

The acid amine salts of N-[3-(2-chlorodibenz[b,e]oxepin-11(6H)-ylidene)propyl]piperazine that can be employed in the present invention include the dihydrochloride, the dihydrobromide, the dihydronitrate, and the hydrogen sulfate, and of these we prefer to use the dihydrochloride.

The salts, MX, that can be used include the sodium, potassium, lithium, ammonium, monomethylammonium, dimethylammonium, and tetramethylammonium, chlorides, bromides, nitrates, and sulfates. Since we prefer to use the dihydrochloride of N-[3-(2-chlorodibenz[b,e]-oxepin-11(6H)-ylidene)-propyl]piperazine, we would, of course, use a chloride salt in the recrystallization as previously discussed, and of the chlorides we prefer to use ammonium chloride. Thus, in the preferred embodiment of the process, we convert the amine to the corresponding dihydrochloride and recrystallize it from an aqueous ammonium chloride solution.

Although the concentration of the aqueous solution of MX employed can usually be varied from about 1 to 3 molar, we prefer to use about a 3 molar salt solution. About 5 to 15 ml. of the aqueous salt solution is used for each gram of the acid amine salt to be recrystallized. In most instances we have found it convenient to use about 8 ml. of aqueous salt solution per gram of acid amine salt.

The recrystallization is carried out by heating a mixture of the acid amine salt with the necessary volume of the aqueous salt solution until all of the acid amine salt is dissolved. Obviously, the temperature to which the mixture must be heated will depend on the ratio of the volume of aqueous salt solution per gram of acid amine salt. Thus, when a large amount of salt solution is employed, heating to a lower temperature will suffice, whereas a smaller amount of salt solution will necessitate heating the mixture to a higher temperature. When 8 ml. of salt solution per gram of acid amine salt is used, heating to a temperature of about 65 to 70° C. is usually sufficient to completely dissolve all of the amine salt. After solution is complete, the mixture is cooled to about 20 to 25° C., whereupon the less soluble acid amine salt of the cis isomer crystallizes from solution and can be easily isolated. In most cases, the cis isomer is obtained in a high degree of purity. The recrystallization may be repeated until the cis isomer is obtained in essentially pure form.

In carrying out the method of the present invention, we have found that the cis isomer can readily be isolated from mixtures of cis and trans N-[3-(2-chlorodibenz[b,e]-oxepin-11(6H)-ylidene)-propyl]piperazine containing as much as 80% of the trans isomer.

The instant invention is exemplified in detail below.

In the first step triphenylphosphine is treated with a stoichiometrically-equivalent amount of 1,3-dibromopropane in the presence of a non-reactive organic solvent such as toluene or xylene. It is especially convenient to use about 2 volumes of xylene for each volume of the triphenylphosphine and 1,3-dibromopropane. The reaction is stirred in a nitrogen atmosphere at a reaction temperature above about 100° C., preferably at about 130° C. for several hours. The product is isolated by cooling the reaction mixture and collecting the crystalline 3-bromopropyltriphenylphosphonium bromide. Alternatively, the reaction mixture may be subjected to a vacuum distillation to remove the solvent; the product remaining is the residue. The 3-bromopropyltriphenylphosphonium bromide is dissolved in about 4 volumes of a polar solvent, for example, methanol or ethanol, and treated with about 2 equivalents, or a slight excess thereof, of piperazine monohydrobromide. The reaction mixture is refluxed for several hours and cooled to room temperature. The crystalline material is filtered and triturated with 9 liters of boiling ethanol. The hot ethanol solution is filtered and the insoluble piperazine dihydrobromide is discarded. The filtrate is concentrated, and the solid residue of crude triphenyl-3-(N-piperazinylpropyl)phosphonium bromide is purified.

Phthalide is reacted with the solution of sodium p-chlorophenoxide in isoamyl alcohol to yield o-(p-chlorophenooxymethyl)benzoic acid, which upon treatment with phosphorus pentoxide in benzene provides 9-chloro-6,11-dihydrodibenz[b,e]oxepin - 11 - one. The triphenyl-3-(N-piperazinylpropyl) phosphonium bromide is suspended in anhydrous tetrahydrofuran and the corresponding ylid is prepared by adding n-butyl lithium to the suspension. After the ylid is formed (formation of a deep red color), a tetrahydrofuran solution of 9-chloro-6,11-dihydrodibenz[b,e]-oxepin-11-one is added. Subsequent treatment of the reaction mixture affords the free amine, N-[3-(2-chlorodibenz[b,e]oxepin - 11(6H) - ylidene)-propyl]piperazine as a mixture of the cis and trans isomers (60% cis/40% trans, as determined by paper chromatography).

This mixture is then conveniently converted to the corresponding cis and trans dihydrochloride salts by adding the mixture to a solution of 3 molar ammonium chloride, heating to about 70° C., and passing into the mixture anhydrous hydrogen chloride until the pH of the mixture is about 2. Cooling the resultant solution to about room temperature causes the cis and trans dihydrochloride salts to separate out of solution. Owing to this preliminary crystallization, there is now a higher ratio of cis amine salts present in the salt mixture, than was originally present in the mixture of the free amine.

The acid amine salt mixture is then recrystallized from 3 molar ammonium chloride. Upon cooling the solution to room temperature essentially pure cis N-[3-2-chlorodibenz[b,e]oxepin - 11(6H) - ylidene) - propyl]piperazine dihydrochloride crystallizes out of solution and is readily isolated. The pure cis acid amine salt is then converted to the free cis amine by standard methods, and reacted with a solution of ethylene oxide in methanol to yield the pharmacologically useful compound cis 4-[3-(2-chlorodibenz-[b,e]oxepin - 11 - (6H) - ylidene) - propyl]-1-piperazine ethanol in the form of the dihydrochloride salt.

The present invention is illustrated by the following examples, which are not to be considered as limiting the scope thereof in any way.

PREPARATION A

A mixture of 161 g. (0.61 mole) of triphenylphosphine and 124 g. (0.61 mole) of 1,3-dibromopropane in 320 ml. of xylene, is slowly heated under an atmosphere of nitrogen to 130° C. The reaction mixture is stirred at this temperature for 20 hours. Upon cooling, the product crystallizes and is filtered. It is triturated with cold benzene, filtered and air-dried to yield 265 g. of crystalline triphenyl - 3 - bromopropylphosphonium bromide (93.5% yield), M.P. 231.0–232.0° C.

To a stirred mixture of 4.5 liters of 2B ethanol and 389 g. (4.52 moles), of anhydrous piperazine, which is at room temperature and under nitrogen, is slowly added 513 ml. of 48% hydrobromic acid (4.96 moles), followed by the addition of 790 ml. of water. Then 1.05 kg. (2.26 moles) of triphenyl-3-bromopropylphosphonium bromide is added in one portion. The resulting clear solution is refluxed and stirred under nitrogen for 5½ hours. It is cooled to about 0° C., and the crystalline material that separates is filtered and triturated with 9 liters of boiling 2B ethanol. The hot mixture is filtered and the 460 g. of piperazine dihydrobromide that is collected is discarded. The filtrate is concentrated in vacuo to about 5 liters and cooled to 0° C. The crystalline product is filtered, washed with cold ethanol, and air-dried to give 966 g. of crude triphenyl - 3 - (N-piperazinylpropyl) phosphonium bromide hydrobromide, M.P. 272.0–275.0° C. This crude material is triturated with 850 ml. of cold water, filtered, and washed first with several small portions of cold water, and then with acetone. After triturating the filtered material with 1 liter of acetone, filtering, and drying in vacuo a 80° C. for 24 hours, 750 g. of pure product are obtained (60% yield), M.P. 291.0–293.0° C.

PREPARATION B

A solution of 540 g. of p-chlorophenol (4.2 moles) and 168 g. of sodium hydroxide (4.2 moles) in about 5 liters of isoamyl alcohol is heated at the reflux temperature until 74 ml. of water is collected in a Dean-Stark trap. To this solution is added 536 g. of phthalide (4.0 moles), whereupon the solution becomes deep red in color. After refluxing for 24 hours, the major portion of the isoamyl alcohol is removed by distillation. The concentrate is then subjected to steam distillation to remove the residual traces of isoamyl alcohol, and then cooled and acidified by the addition of 3 N hydrochloric acid. The precipitated product is filtered and recrystallized from 2½ to 3 liters of ethanol to provide 478 g. (46% yield) of o-(p-chlorophenoxymethyl) benzoic acid, M.P. 164.5–166.5° C.

To 1510 g. (10.62 moles) of phosphorus pentoxide suspended in 5 liters of benzene is added in small portions with stirring 468 g. (1.77 moles) of o-(p-chlorophenoxymethyl) benzoic acid. After the addition is complete, the mixture is refluxed for 1 hour. The benzene is decanted and set aside, 4 liters of fresh benzene are added to the reaction mixture, and the resulting mixture is refluxed for several hours. The benzene layer is decanted and combined with the first benzene extract. The benzene extracts are washed with excess sodium hydroxide solution and water, and dried. Evaporation of the benzene provides 341 g. of 9 - chloro - 6,11-dihydrodibenz[b,e] oxepin-11-one, M.P. 124.5–128° C. Recrystallization from benzene-ethanol provides 320 g. of product, M.P. 125–127° C.

After decomposition of the residual phosphorus pentoxide with water, extraction with benzene, and recrystallization of the crude material, an additional 58.5 g. of product is obtained, M.P. 125–128° C.

PREPARATION C

A solution of 2.18 molar n-butyl lithium in heptane, containing 0.430 mole of this reagent, is added, over a period of 30 minutes, to a suspension of 122 g. (0.222 mole) of triphenyl - 3 - (N - piperazinylpropyl)phosphonium bromide hydrobromide in 400 ml. of anhydrous tetrahydrofuran. To the resulting deep-red ylid solution is added a solution of 50 g. (0.204 mole) of 9-chloro-6,11 - dihydrodibenz[b,e]oxepin - 11 - one in 15 ml. of anhydrous tetrahydrofuran. After stirring the reaction mixture at room temperature for 16 hours, 100 ml. of water is added, and the solvent is evaporated at reduced pressure.

A mixture of 30 ml. of water and 500 ml. of benzene is added to the reaction mixture and the pH of the aqueous phase of the two phase system is adjusted to about 3 to 5 with N hydrochloric acid. The mixture is thoroughly shaken and the benzene layer is discarded. The pH of the acidic aqueous phase is adjusted from about 10 to 11 with 10% sodium hydroxide, and the aqueous phase is extracted with benzene. The benzene extracts are combined, washed with water, dried over anhydrous sodium sulfate, and evaporated to yield 56 g. of N-[3-(2-chlorodibenz[b,e]oxepin - 11(6H) - ylidene) - propyl]piperazine as a clear viscous oil. Paper chromatographic analysis shows this product to consist of a mixture of 60% of the cis isomer and 40% of the trans isomer.

EXAMPLE I

The mixture of the cis and trans isomers of N-[3-(2-chlorodibenz[b,e]-oxepin - 11(6H) - ylidene) - propyl] piperazine prepared in Preparations A through C is added to 448 ml. of 3 molar ammonium chloride solution. This admixture is heated to 70° C., and anhydrous hydrogen chloride is passed into the mixture until its pH is about 2. The resulting solution is cooled to room temperature and the dihydrochloride salt of N - [3 - 2-chlorodibenz [b,e]oxepin - 11(6H) - ylidene) - propyl]piperazine, which is enriched with the cis isomer, is separated, M.P. 191–198° C.

Recrystallization from 448 ml. of 3 molar ammonium chloride, which involves treatment with decolorizing charcoal (Darco), affords 29.5 g. (35% yield) of pure cis N - [3 - (2 - chlorodibenz[b,e]oxepin-11(6H)-ylidene-propyl]piperazine dihydrochloride (purity determined by paper chromatographic analysis), M.P. 201–205° C.

EXAMPLE II

A mixture of N - [3 - (2 - chlorodibenze [b,e]oxepin-11 (6H)-ylidene)-propyl]piperazine dihydrochloride, containing 60% of the cis and 40% of the trans isomers, is recrystallized with the solutions given bleow. In these examples 8 ml. of solution is used for every g. of amine salt to be recrystallized.

| Recrystallization solution | Percent of amine salt recovered | Product purity; percent cis isomer |
|---|---|---|
| 1.0 M NH$_4$Cl | 16 | 90 |
| 2.0 M NH$_4$Cl | 42 | 95 |
| 3.0 M NH$_4$Cl | 49 | 90 |
| 3.0 M LiCl | 59 | 75 |
| 3.0 M NaCl | 59 | 80 |
| 3.0 M CH$_3$NH$_2$·HCl | 71 | 85 |
| 3.0 M (CH$_3$)$_2$NH·HCl | 68 | 85 |
| 3.0 M (CH$_3$)$_4$N$^\oplus$ Cl$^\ominus$ | 67 | 80 |

Similar results are obtained when the crystallization is carried out with aqueous solution of potassium chloride.

EXAMPLE III

Using the procedure of Example II, similar results are obtained when mixtures of cis and trans N-[3-(2-chlorodibenz[[b,e]oxepin - 11(6H) - ylidene) - propyl]piperazine dihydrobromide are recrystallized from aqueous solutions of: NH$_4$Br, LiBr, NaBr, KBr, CH$_3$NH$_3^\oplus$Br$^\ominus$, (CH$_3$)$_2$NH$_2^\oplus$Br$^\ominus$ and (CH$_3$)$_4$N$^\oplus$Br$^\ominus$.

EXAMPLE IV

Using the procedure of Example II, similar results are obtained when mixtures of cis and trans N-[3-(2-chlorodibenz[b,e]oxepin - 11(6H) - ylidene) - propyl]piperazine·2HNO$_3$ are recrystallized from aqueous solutions of: NH$_4$NO$_3$, LiNO$_3$, NaNO$_3$, KNO$_3$, (CH$_3$)NH$_3^\oplus$NO$_3^\ominus$, (CH$_3$)$_2$NH$_2^\oplus$NO$_3^\ominus$ and (CH$_3$)$_4$N$^\oplus$NO$_3^\ominus$.

EXAMPLE V

Using the procedure of Example II, similar results are obtained when mixtures of cis and trans N-[3-(2-chlorodibenz[b,e]oxepin - 11(6H) - ylidene) - propyl]piperazine H$_2$SO$_4$ are recrystallized from aqueous solutions of (Na$_4$)$_2$SO$_4$, Li$_2$SO$_4$, Na$_2$SO$_4$,K$_2$SO$_4$[(CH$_3$)NH$_3^\oplus$]$_2$SO$_4^\ominus$, [(CH$_3$)$_2$NH$_2^\oplus$]$_2$SO$_4^\ominus$, and [(CH$_3$)$_4$N$^\oplus$]$_2$SO$_4^\ominus$.

Cis N - [3 - (2 - chlorodibenz[b,e]oxepin-11(6H)-ylidene) - propyl]piperazine dihydrochloride is converted to the free amine by adding 10% sodium hydroxide to a cold stirred suspension of the amine salt in benzene. The mixture is shaken, and the benzene layer is separated and set aside. The alkaline aqueous phase is extracted with benzene. The benzene extracts are combined, washed with water, dried over sodium sulfate and evaporated to provide the free cis N - [3 - (2 - chlorodibenz[b,e]oxepin-11(6H)-ylidene)-propyl]piperazine.

In this fashion, 5.1 g. of the cis amine (14.35 mmoles) is prepared and dissolved in 100 ml. of methanol. To this solution, is added 1 ml. of ethylene oxide, and the resultant mixture is refluxed for 2 hours. The solvent is removed under reduced pressure, and the residue is dissolved in 25 ml. of ethanol and the pH of this solution is adjusted to about 2 with an ethanolic solution of hydrogen chloride.

The mixture is cooled and the product which separates from the solution is collected to give 7.0 g. of crude cis N - [3 - (2 - chlorodibenz[b,e]oxepin-11(6H)-ylidene)-propyl] - 1 - piperazine ethanol dihydrochloride, M.P. 253–257° C. Recrystallization from ethanol-water provides 5.0 g. (74% yield) with a melting point of 258–261° C.

What is claimed is:
1. A process for recovering pure cis N-[3-(2-chlorodibenz[b,e]oxepin-11(6H)ylidene)-propyl]piperazine from a mixture of both the cis and trans isomers of said oxepin, which comprises dissolving said oxepin mixture in the form of the acid amine salt in an aqueous solution of a salt having the formula MX; wherein:

M is a member selected from the group consisting of sodium, potassium, lithium, ammonium, monomethylammonium, dimethylammonium, tetramethylammonium;

X is a member selected from the group consisting of chloride, bromide, nitrate, and sulfate;

and the salt MX employed is so chosen that its anion X is identical with the anion of the said acid amine salt; and crystallizing and separating from the solution the less soluble cis acid amine salt.

2. The process of claim 1 wherein the said oxepin acid amine salt is the hydrochloride and X is chloride.

3. The process of claim 1 wherein the said oxepin acid amine salt is the hydrochloride and MX is ammonium chloride.

4. The process for recovering pure cis N-[3-(2-chlorodibenz[b,e]oxepin - 11(6H) - ylidene)-propyl]piperazine from a mixture of both the trans and cis isomers of said oxepin which comprises the sequential steps of:

(a) preparing a 1 to 3 molar aqueous solution of the salt MX wherein M is a member selected from the group consisting of sodium, potassium, lithium, ammonium, monomethylammonium, dimethylammonium, tetramethylammonium; X is a member selected from the group consisting of chloride, bromide, nitrate, and sulfate;

(b) dissolving said oxepin mixture in the form of an acid amine salt having an anion identical with the anion X of the salt MX in a sufficient volume of the aqueous solution of the salt MX to provide 5 to 15 ml. of said aqueous solution per gram of acid amine salt mixture;

(c) cooling the resultant solution of step (b) until the less soluble cis acid amine salt crystallizes from solution; and (d) separating the precipitated cis acid amine salt from the dissolved trans acid amine salt of higher solubility.

5. The process of claim 4 wherein the acid amine salt is the hydrochloride, X is chloride, and M is a member selected from the group consisting of sodium, potassium, lithium, ammonium, monomethylammonium, dimethylammonium, and tetramethylammonium.

6. The process of claim 4 wherein the acid amine salt is the hydrochloride and MX is ammonium chloride.

7. The process of claim 4 wherein the acid amine salt is the hydrochloride, MX is ammonium chloride, and the concentration of MX in the said aqueous solution is about 3 molar.

8. The process of claim 4 wherein the acid amine salt is the hydrochloride, MX is ammonium chloride, and the concentration of MX in the said aqueous solution is about 2 molar.

9. The process of claim 4 wherein the acid amine salt is the hydrochloride, MX is ammonium chloride, and the concentration of MX in the said aqueous solution is about 1 molar.

References Cited

Netherlands Published Application No. 6,411,861, pp. 1 to 10 and 16 to 18 relied upon (Apr. 15, 1965).

JOHN D. RANDOLPH, Primary Examiner

U.S. Cl. X.R.

424—250